United States Patent [19]

Hufgard

[11] Patent Number: 5,383,683
[45] Date of Patent: Jan. 24, 1995

[54] MOTOR VEHICLE

[76] Inventor: Albert Hufgard, Antoniusstrasse 2-14, D-63 786 Hösbach, Germany

[21] Appl. No.: 155,955

[22] Filed: Nov. 19, 1993

[30] Foreign Application Priority Data

Nov. 19, 1992 [DE] Germany .............................. 4238927

[51] Int. Cl.6 ...................... B62D 25/02; B62D 25/16; B62D 35/00; B62K 11/00
[52] U.S. Cl. ...................................... 280/781; 280/798
[58] Field of Search ............... 280/781, 788, 786, 798, 280/797, 800

[56] References Cited

U.S. PATENT DOCUMENTS

| 1,343,682 | 6/1920 | Richmond | 280/798 |
| 2,612,964 | 10/1952 | Hobbs | 180/312 |
| 4,081,197 | 3/1978 | Ackel | 280/781 |
| 4,289,214 | 9/1981 | Spence | 280/781 |

FOREIGN PATENT DOCUMENTS 767674 3/1953 Germany .
2254055 9/1992 United Kingdom ........ B62D 39/00

Primary Examiner—Kenneth R. Rice
Attorney, Agent, or Firm—Webb Ziesenheim Bruening Logsdon Orkin & Hanson

[57] ABSTRACT

The present invention is concerned with a motor vehicle, in particular, a motor vehicle having an electric motor, comprising a chassis having at least three wheels, with the side walls of the bottom part of the chassis containing the seats being formed of cross-connected hollow elements and the upper part of the chassis being formed as a hatch to be opened at least partly. To essentially reduce the front-sided in-flow drag, in the practice of the invention, the hollow elements are formed of two tubular supports open at the front and rear ends. All cross-sections of the supports, between the openings of identical cross-section, correspond to the cross-sections of the openings. The cumulative cross-sections of the two supports correspond at least to half the cross-sectional size of the bottom part of the chassis.

7 Claims, 2 Drawing Sheets

MOTOR VEHICLE

BACKGROUND OF THE INVENTION

1. Field of the Invention

This invention concerns road vehicles, more particularly motor vehicles with electric motors, and has for its object to provide an improved construction of chassis therefore.

2. Description of the Prior Art

Motor vehicles of this type are known in the art, for example, from UK Patent Application No. 2 254 055 and also from German Patent No. 767 674.

The aerodynamic drag of private passenger cars largely depends on the size and shaping of the front-sided overall in-flow face which, for that reason, is substantially streamlined, i.e. tapered to ascend backwardly which, however, is limited to the anterior bottom part of the chassis, in particular, in cases where the drive unit is arranged in the front of the motor vehicle. This also applies to the motor vehicles according to the aforementioned literature references, in which the hollow parts forming the supports are sealed at the front and rear ends. A motor vehicle construction of the type as set out according to U.S. Pat. No. 2,612,964 also does not contribute to reducing the aerodynamic drag although it comprises a channel open at the front and rear ends. Apart from the fact that this is a centrally arranged channel in which are housed the engine along with the cooling fan, exhaust silencer and parts of the gear box, thereby forming aerodynamic drag, the channel, on the in-flow side, relative to the total front face, is of a very small cross-section subsequently expanding and rearwardly re-constricting in conformity with the in-flow opening.

SUMMARY OF THE INVENTION

More particularly, this invention has for its object the provision of a chassis of a motor vehicle whose drag-active front face is substantially reduced without impairing the stability of the chassis.

The motor vehicle comprises a chassis having at least three wheels, wherein the side walls of the chassis bottom part containing the seats are formed of cross-connected hollow elements and the upper part of the chassis is formed as a hatch that can be opened at least partly and wherein, according to the invention, the hollow elements are formed of two tubular supports open at the front and rear sides. All cross-sections of the supports, between the openings of identical cross-section correspond to the cross-sections of the two openings. The cumulative cross-sections of the two supports correspond at least to half the cross-sectional size of the chassis bottom part.

The phrase "at least to half the cross-sectional size of the chassis bottom part" means that based on the usual widths of private passenger cars, so much space will have to be left between the supports that a normal seat width remains available, i.e. the cross-sectional face of the two supports is so dimensioned that a substantial part of the drag-active in-flow face of the chassis bottom part no longer offers an in-flow drag at the front side.

The supports, preferably of circular cross-sections, also may be of box-type or oval cross-sections. It is, in particular, in respect of supports of box-type or oval cross-sections that at least one reinforcing wall, longitudinally extended and transversely oriented to the longitudinal extension thereof may be provided therein yet to be explained in greater detail.

Disposed within the free space between the supports are the seats, and before or behind the same are located the drive unit, the batteries, the tank, the trunk etc. To reduce the drag-active front face as far as possible, the height of the supports is dimensioned so as to correspond or approximately correspond to half the height of the chassis.

To minimize, moreover, the risk of personal injury caused by the peripheral edges of the open supports, peripheral protective edge screens rounded at least at the front side are located at least in the front before the peripheral edges of the supports, which protective screens, feasibly, are formed as frames conforming to the peripheral profile of the supports. Additional advantageous embodiments reside in that the wheel boxes of the chassis, at least in part, are to be disposed in a way protruding into the interior of the supports with at least the front-sided in-flow faces of the wheel boxes tapering and extending beyond the overall length of the supports available ahead thereof. Finally, should the drive unit of the motor vehicle require cooling, drive cooling units elongated in the longitudinal direction could be provided in at least one of the supports. Incidentally, the supports open at the front and at the rear offer the advantage to accommodate therein long-sized goods (such as skies, rods or the like) otherwise not readily houseable in the motor vehicle, which goods would, of course, have to be adequately secured.

Depending on the overall dimensions of the chassis and on the overall conception of the automotive vehicle, it is by all means possible to provide within the free space between the supports, for example, not only two seats arranged in series but even four seats conventionally arranged, in which respect, however, a certain restricted seating comfort would have to be accepted as the width of the two supports would have to be added to the overall seating width. Incidentally, in the private passenger car according to the invention side wall reinforcements of the type as provided according to German Patent 767 674 are eliminated as the tubular supports not interrupted by door openings and provided with corresponding dimensions are per se substantially more stable than normal side walls or doors of automotive vehicles.

BRIEF DESCRIPTION OF THE DRAWINGS

Embodiments of the invention will hereinafter be described in conjunction with the accompaning drawings, wherein.

DESCRIPTION OF THE PREFERRED EMBODIMENTS

Figure 1:
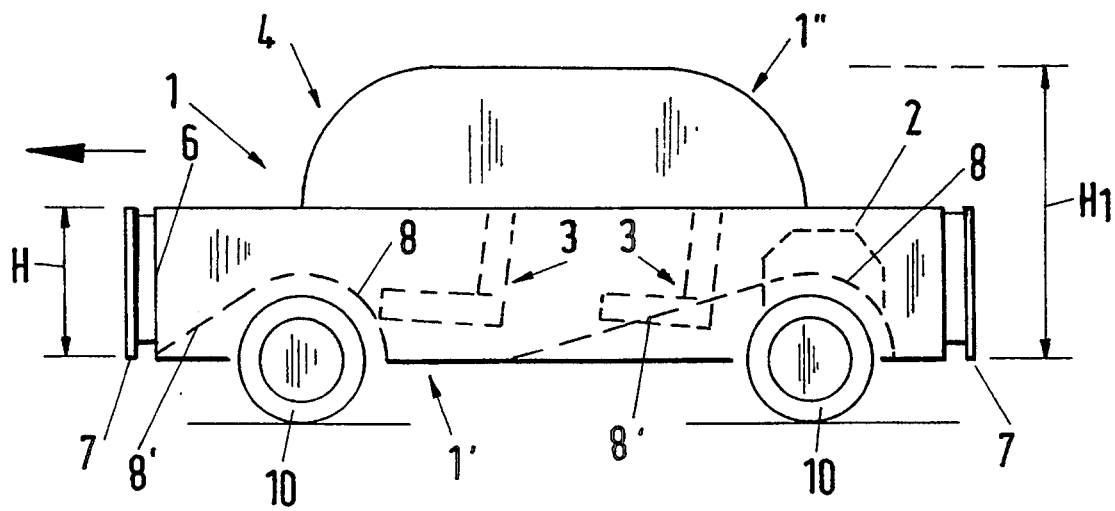
FIG. 1 is a highly schematical side view of a motor vehicle.
Figure 2:
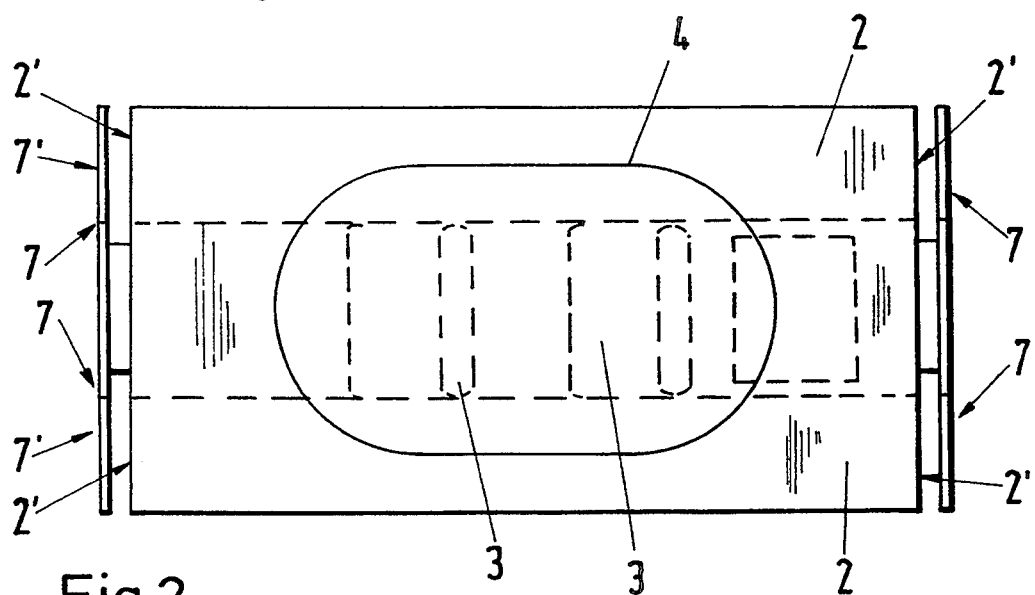
FIG. 2 is a plan view of the motor vehicle according to FIG. 1.

It is important for all forms of embodiment of the private passenger car provided with four wheels 10 as shown that the hollow elements be formed of two tubular supports 2 open at the front and rear sides and that all cross-sections of the supports 2 between the openings 2' of identical cross-sections correspond to the cross-sections of the said openings and that the cross-sections of the two supports 2 correspond at least to half the cross-sectional size of the chassis bottom part 1'.

All forms of embodiment are shown with the seats arranged in series within the free space between the two supports 2 which extend throughout the length of the private passenger car. The remainder of the free space in the chassis 1 serves to accommodate the drive unit (not shown) and other elements and spaces required in automotive vehicles. Concerning the cross-sectional dimension and shaping of the supports 2 relative to the drag-effective front face (see FIGS. 3,4,5,6) such cross-sectional conditions and arrangements apply as are, for example, shown in the figures.

The height H of the supports 2 is shown to correspond or approximately correspond to half the height $H_1$ of the chassis 1. The configuration of the upper part 1" of the chassis 1 in the form of a hatch 4 at least partly to be opened does not require a closer explanation as such foldable, swivable or diplaceable hatches 4 are adequately known in the art.

Figure 3:
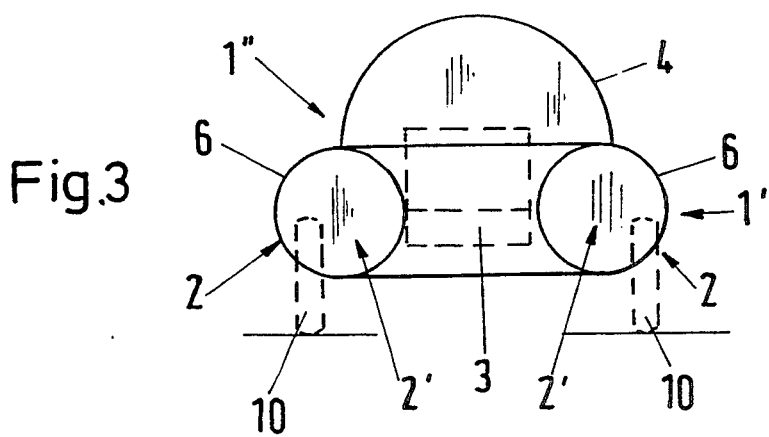
FIG. 3 is a front view of the automotive vehicle of the invention according to FIGS. 1 and 2.
Figure 4:
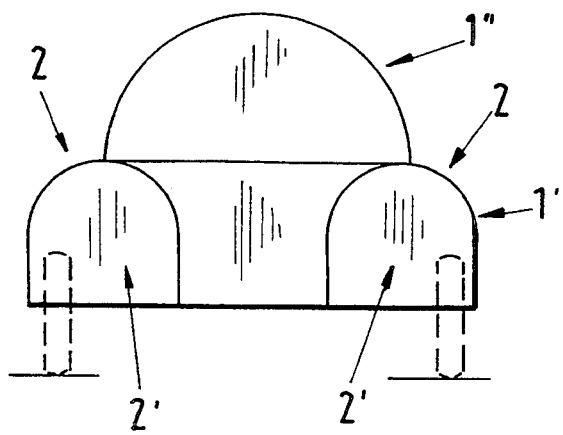
FIGS. 4, 5 are additional front views of different cross-sectional profiles of the suppports.
Figure 5:
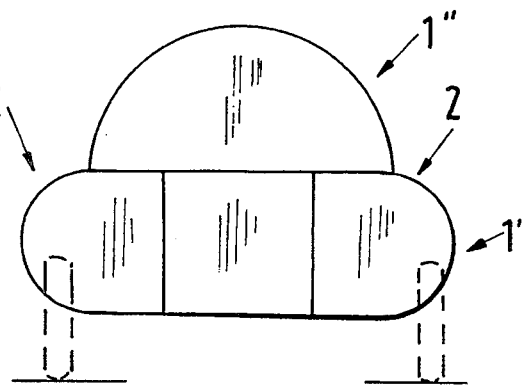
Figure 6:
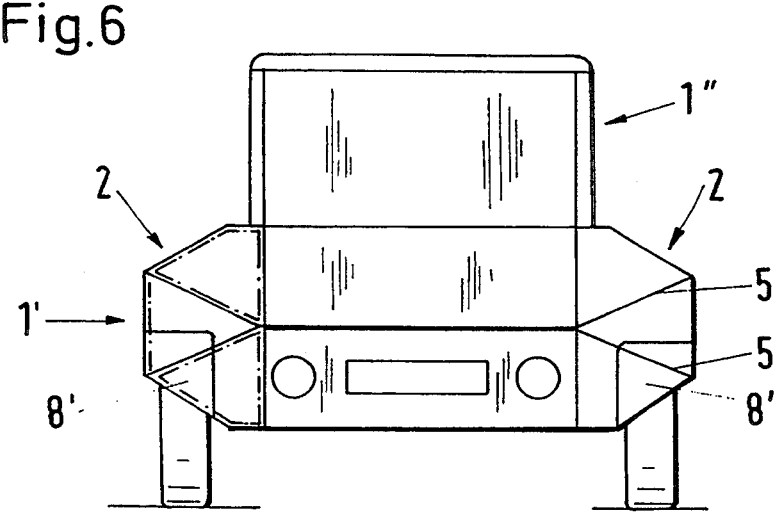
FIGS. 6, 7 are front and side views of a another form of embodiment of a passenger car.

Concerning the feature that at least one reinforcing wall 5 elongated and oriented transversely to the longitudinal extension thereof may be provided, reference is made to FIG. 6 as in such supports 2 of box-type cross-sections, the provision of reinforcing walls 5 is most feasible. However, basically, also other cross-sectional forms such as those as shown in FIGS. 3, 4 and 5, may be provided with reinforcing walls 5 of this type. The phrase "reinforcing wall" also includes grid-type stabilizing elements.

For the afore-mentioned reasons, peripheral edge screens 7 at least rounded at the front side are provided at least forwardly ahead of the peripheral edges 6 of the supports 2, which protective screens, advantageously, are formed as frames 7' conforming to the peripheral profile of the supports 2 and being suitably fixed at the required space from the chassis. Even if no "reinforcement walls" 5 were put into the supports 2, the said frames 7' could be of a configuration as dash-dotted, for example, in FIG. 6.

The wheel boxes 8, in the examples of the embodiments as shown are fully integrated into the supports 2, with the front-sided in-flow faces 8' of the wheel boxes 8, as shown in broken lines in FIG. 1, for drag reducing purposes being tapered and extended throughout the length of the supports 2 available ahead thereof.

Figure 7:
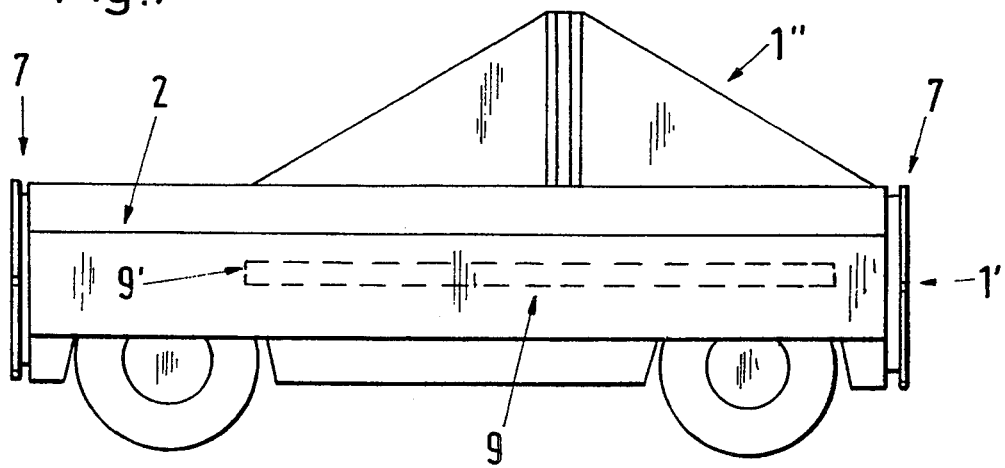

Apart from the afore-mentioned capability of using the supports 2, in case of need, as transportation space for long-sized goods to be transporeted it will, in addition, be possible—as shown in broken lines in FIG. 7—to house in at least one of the supports 2 elongated in the longitudinal extension drive cooling units 9 having small in-flow faces 9' involving substantially less aerodynamic drag than the traditional arrangement of relatively large-sized coolers in a direction transverse of the driving direction.

While a full and complete description of the embodiments of the invention has been set forth in accordance with the dictates of the Patent Statutes, it should be understood that modifications can be made without departing from the spirit of the invention or the scope of the appended claims.

I claim:

1. A motor vehicle comprising a chassis having upper and bottom parts and having at least three wheels, with the bottom part of the chassis having side walls formed an hollow elements, with the upper part of the chassis formed as a hatch at least partly to be opened, with the hollow elements formed of two tubular supports having front and rear openings of identical cross-section at front and rear ends, with all cross-sections of the supports between the front and rear openings corresponding to the cross-section of the openings, and with the cumulative cross-sections of the two supports corresponding to at least half the total cross-section of the chassis bottom part.

2. The motor vehicle of claim 1, wherein the height of the supports corresponds to half the overall height of the chassis.

3. The motor vehicle of claim 1, further including peripheral edge screens rounded at a front side and located in front of peripheral edges of the supports.

4. The motor vehicle of claim 3, wherein the peripheral edge screens are formed as frames conforming to a peripheral profile of the supports.

5. The motor vehicle of claim 1, wherein said wheels are each provided in a respective wheel box, with each wheel box protruding at least partly into an interior of the supports, and with each wheel box having a front-sided in-flow face which is tapered and which extends throughout a length of the supports in front of said wheels.

6. The motor vehicle of claim 1, further including drive cooling units located in at least one of the supports and extending in a longitudinal direction.

7. The motor vehicle of claim 1, further including a reinforcing wall located in at least one of the supports and extending in a longitudinal direction.

* * * * *